United States Patent
Bradshaw

(10) Patent No.: US 8,602,652 B1
(45) Date of Patent: Dec. 10, 2013

(54) TURBOCHARGER BEARING ASSEMBLY

(75) Inventor: Joshua Bradshaw, Maple Ridge (CA)

(73) Assignee: ADP Distributors, Inc. (CA)

( * ) Notice: Subject to any disclaimer, the term of this patent is extended or adjusted under 35 U.S.C. 154(b) by 16 days.

(21) Appl. No.: 13/426,486

(22) Filed: Mar. 21, 2012

Related U.S. Application Data

(60) Provisional application No. 61/454,615, filed on Mar. 21, 2011.

(51) Int. Cl.
*F16C 33/10* (2006.01)

(52) U.S. Cl.
USPC ............................ 384/99; 384/504; 384/474

(58) Field of Classification Search
USPC ............ 384/99, 504, 512, 473–475; 417/407
See application file for complete search history.

(56) References Cited

U.S. PATENT DOCUMENTS

| | | | | |
|---|---|---|---|---|
| 4,652,219 | A * | 3/1987 | McEachern et al. | 417/407 |
| 5,076,766 | A * | 12/1991 | Gutknecht | 417/407 |
| 5,253,985 | A * | 10/1993 | Ruetz | 384/473 |
| 2006/0188185 | A1* | 8/2006 | Mavrosakis | 384/99 |
| 2007/0134106 | A1* | 6/2007 | McKeirnan, Jr. | 417/407 |
| 2008/0267548 | A1* | 10/2008 | Chriss | 384/492 |

* cited by examiner

*Primary Examiner* — Thomas R Hannon
(74) *Attorney, Agent, or Firm* — Dwayne E. Rogge; Schacht Law Office, Inc.

(57) ABSTRACT

Disclosed herein is an axially balanced load turbocharger assembly as shown in one form comprises several substantially known components, generally a compressor wheel 22, a turbine wheel 24 and a shaft 26. One form of a housing 28 is also disclosed, which in the specific embodiment disclosed herein comprises several novel components. The apparatus utilizes an oil port in fluid communication with an external oil source, and several oil channels in the housing and in the bearing assembly to direct lubrication oil to all parts which move (rotate) in relation to adjacent components. The apparatus is configured to balance an axially directed load on the shaft so as to minimize damage to the turbocharger, and in particular to the bearing assembly.

5 Claims, 3 Drawing Sheets

TURBOCHARGER BEARING ASSEMBLY

BACKGROUND OF THE DISCLOSURE a) Field of the Invention

While turbochargers and turbocharger shaft bearings are well known in the art, such as that disclosed in US patent application 2007/0134106, incorporated herein by reference, due to the incredibly high rotational speeds and forces exerted upon these members, failure of the bearings within turbochargers has been a problem.

Disclosed herein is an improved turbocharger bearing assembly which has shown through testing to be very effective in providing an axially balanced load turbocharger bearing, as depicted in FIG. 1.

DETAILED DESCRIPTION

Figure 1:
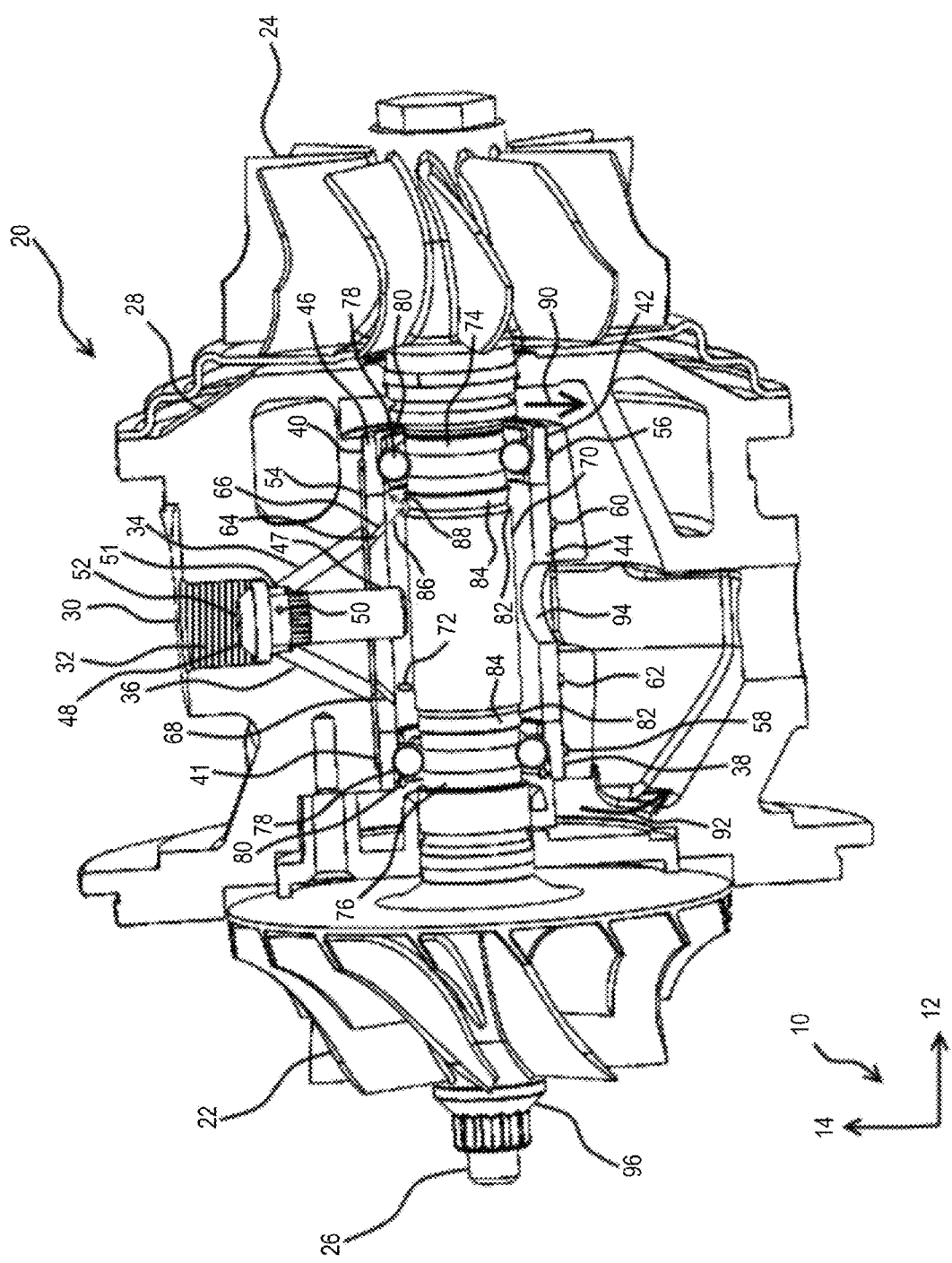
FIG. 1 is a side cutaway view of the apparatus.
Figure 2:
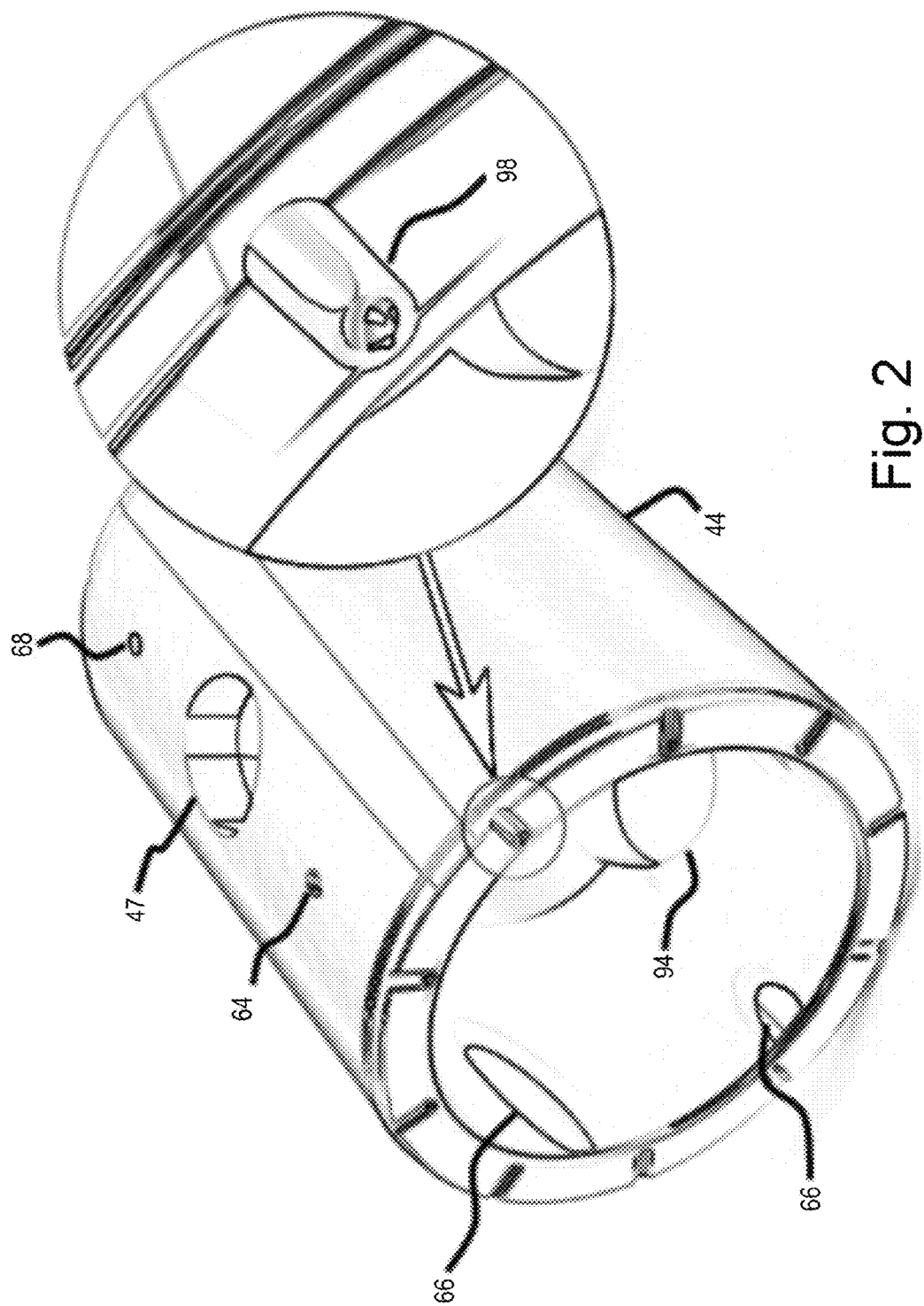
FIG. 2 is a perspective view of one embodiment of an outer spacer.

Before beginning a detailed description, an axes system 10 is defined herein comprising a longitudinal axis 12 and a radially outward axis 14. This axis system 10, and relative terms such as "left" and "right" are used for assistance in defining the interoperating components and their relative positions, and are not intended to be limiting.

The disclosed axially balanced load turbocharger assembly as shown in one form comprises several substantially known components, generally a compressor wheel 22, a turbine wheel 24 and a shaft 26. One form of a housing 28 is also disclosed, which in the specific embodiment disclosed herein comprises several novel components. The mechanics and operation of a turbocharger in general are disclosed in many references, including the '106 application disclosed above and incorporated herein by reference.

As shown, the turbocharger comprises an oil port 30 having a threaded inner surface comprising threads 32. A plurality of oil channels 34 and 36 extends from the oil port 30 towards a central cavity 38. Within this central cavity 38 is positioned a bearing assembly 20, which is positioned around the shaft 26 in order to reduce as much as possible the amount of friction between the shaft 26 and the housing 28, since the bearing shaft 26 operates at incredibly high rotational speeds relative to the housing.

To provide a low friction coefficient, the bearing assembly 20 comprises a first annular style bearing assembly 40, which has a surface that engages a surface of the inner cavity 38 generally at position 42. As the annular style bearing assembly 40 is not press fit into position, a very small gap, such as in the range of 0.002"±0.002" inches (all further measurements like this are in inches unless otherwise indicated), may be provided therebetween to allow for floating of the bearing assembly 40 relative to the central cavity 38. This allows for a very thin layer of oil to be positioned therebetween to further decrease the frictional coefficient between the shaft 26 and the housing 28. This gap further absorbs vibration and reduces radial shaft motion. An outer spacer 44 is then placed within the central cavity 38 and in contact with a facing surface of the outer race ring 46 of the bearing assembly 40. In one embodiment, a gap of about 0.00025" exists between the outer race ring on either end in a non-loaded condition. In addition, lubrication channels 98 may be provided to allow even distribution of lubrication oil between the outer spacer and the outer race ring. During normal operation, the axial force frequently changes direction longitudinally from left to right with respect to FIG. 1. When the axial force is pushing to the left, substantially the entire axial force is translated to the facing surface of the bearing assembly 40. This removes all axial force from bearing assembly 41 and provides a small gap between the faces of about 0.0005"+/−0.0003" allowing bearing assembly 41 to spin freely reducing the friction and surface speeds occurring within bearing assembly 41. When the axial force is pushing to the right, the reverse effect occurs and the facing surface of the bearing assembly 41 will absorb the entire axial force while bearing assembly 40 is free to spin. The outer spacer 44 comprises a void 47 having an inner diameter substantially identical (within 0.002" per side ±0.001") to the outer diameter of a locator pin 48, positioned in the oil port 30. (In one form, the pin is not threaded in and is only held in place by a threaded oil fitting which is not shown). The locator pin 48 in one form therefore holds the outer spacer 44 in position. The locator pin 48 further comprises at least one hole 50, such that when an oil fitting is positioned within the oil port 30 and provides oil into a central opening 52 of the locator pin 48, the oil is vented outward into plug annular channel 51 to the oil channels 34 and 36. The oil is then disposed into a longitudinal oil groove 54, machined or otherwise provided in the central cavity 38 and in fluid communication with the oil channels 34 and 36. The longitudinal oil groove 54 is also in fluid communication with annular oil grooves 56 and 58, which provide a lubricant pathway to the surface 42 between the housing 28 and the bearing assemblies 40 and 41.

In addition, the longitudinal oil groove 54 is in fluid communication with annular oil grooves 60 and 62, which align with the radially outward portion 64 of oil channels 66 and 68 through the outer spacer 44. These oil channels 66/68 may be annular, linear, or otherwise oriented.

Prior to inserting the second bearing assembly 41 into the central cavity 38, an inner spacer 70 is positioned within the central cavity 38 having a gap 72 between the inner spacer 70 and outer spacer 44. The inner spacer 70 aligns with the inner race ring 74 of the bearing assembly 40 and with the inner race ring 76 of the bearing assembly 41. A small gap on the order of 0.0002"±0.0002" is provided between the inner surface of the inner spacer 70 and the outer surface of the shaft 26. As can be seen, bearings (balls) 78 are provided in one form between the inner and outer race ring of each component and held in place by a cage 80. The inner spacer 70 rides upon the outer surface of the shaft 26 and rotates therewith but is generally not press fit into place upon the shaft 26 to allow for easy removal and replacement of the bearing assemblies 40.

Figure 3:
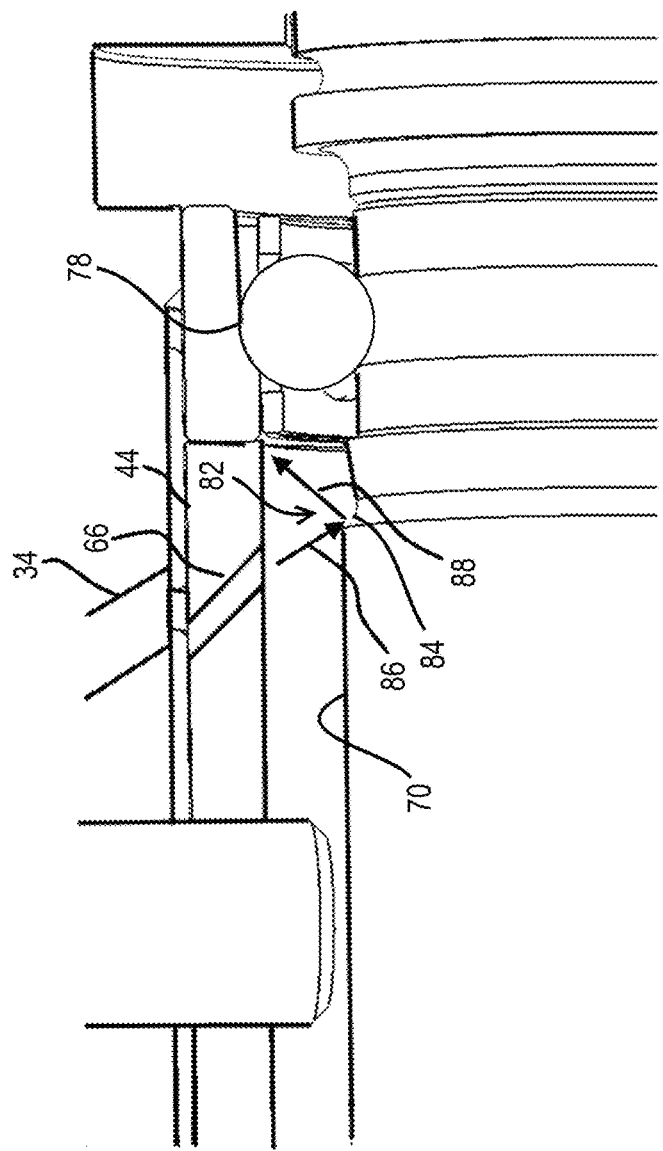
FIG. 3 is a detail view of a section of the embodiment shown in FIG. 1.

As can be seen in FIG. 3 which is a detail view of a section of FIG. 1, in one form, the inner spacer 70 comprises a plurality of annular grooves 82 comprising an angled surfaces 84 that align with the oil channels 66 and 68 in such a way that as the oil travels in direction 86, it impacts the angled surfaces 84, which are rotating in an incredibly high rotational speed relative to the oil channels 64 and 68. As the oil impacts the surfaces 84, the oil stream substantially vaporizes into an incredibly small air-suspended mist, which travels in direction 88 to impact the balls 78, cage 80, and the other portions of the bearing assemblies 40 and 41 to provide a very thin and even layer of oil upon the surfaces thereof.

The oil may then pass through the bearing assemblies 40 and 41 and be discharged along pathways 90 and 92, or it may alternatively pass through an opening 94 in the outer spacer 44, whereupon it may be filtered and reused.

Once the bearing assemblies 40 and 41 and spacers 44 and 70 are in place, the shaft 26 is passed through the components described above, whereupon the compressor wheel 22 or turbine wheel 24 is placed upon the shaft 26 and either threaded in place or attached by way of a nut 96. Alternatively, a boreless or blind hole compressor wheel 22 or turbine wheel 24 may be utilized.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. An axially balanced load turbocharger bearing assembly for use between a turbocharger housing having an inner cavity and a shaft; the bearing assembly comprising:
    a. a first annular bearing assembly having an outer surface that engages a surface of the inner cavity;
    b. a second annular bearing assembly having an outer surface that engages a surface of the inner cavity;
    c. an outer spacer having an outer diameter substantially the same as an outer diameter of both the first annular bearing assembly and the second annual bearing assembly, the outer spacer in contact with facing surfaces of the first annular bearing assembly and the second annual bearing assembly;
    d. an inner spacer having an inner diameter substantially the same as an inner diameter of both the first annular bearing assembly and the second annual bearing assembly, the inner spacer in contact with facing surfaces of the first annular bearing assembly and the second annual bearing assembly;
    e. wherein the inner diameter of the inner spacer, and the inner diameter of both the first annular bearing assembly and the second annual bearing assembly are substantially the same as an outer diameter of the shaft;
    f. wherein the outer spacer is fixed in place relative to the turbocharger housing
    g. wherein the inner spacer rotates with the shaft;
    h. the turbocharger housing comprising an oil port in fluid communication with an oil source external of the turbocharger housing;
    i. wherein the turbocharger housing comprises at least one turbocharger housing oil channel providing fluid communication between the oil port and the outer spacer; and
    j. wherein the outer spacer comprises at least one outer spacer oil channel therethrough, aligned with the turbocharger housing oil channel.

2. The bearing assembly as recited in claim 1 further comprising:
    a. an annular ring provided on an outer surface of the inner spacer adjacent the outer spacer oil channel; and
    b. wherein the annular ring is angled relative to an axis of rotation of the shaft.

3. The bearing assembly as recited in claim 1 further comprising a surface defining an oil drain opening in the lower portion of the outer spacer.

4. The bearing assembly as recited in claim 1 further comprising a surface defining an oil groove in the turbocharger housing between a radially outward surface of the outer spacer and the adjacent surface of the turbocharger housing.

5. An axially balanced load turbocharger bearing assembly for use between a turbocharger housing having an inner cavity, and a rotating shaft, the bearing assembly comprising:
    a. a first annular bearing assembly having an outer surface that engages a surface of the inner cavity;
    b. a second annular bearing assembly having an outer surface that engages a surface of the inner cavity;
    c. an outer spacer having an outer diameter substantially the same as an outer diameter of both the first annular bearing assembly and the second annual bearing assembly, the outer spacer and in contact with facing surfaces of the first annular bearing assembly and the second annual bearing assembly;
    d. an inner spacer having an inner diameter substantially the same as an inner diameter of both the first annular bearing assembly and the second annual bearing assembly and in contact with facing surfaces of the first annular bearing assembly and the second annual bearing assembly;
    e. wherein the inner diameter of the inner spacer, and the inner diameter of both the first annular bearing assembly and the second annual bearing assembly are substantially the same as an outer diameter of the shaft;
    f. wherein the outer spacer is fixed in place relative to the turbocharger housing
    g. wherein the inner spacer rotates with the shaft;
    h. the turbocharger housing comprising an oil port in fluid communication with an oil source external of the turbocharger housing;
    i. wherein the turbocharger housing comprises at least one turbocharger housing oil channel providing fluid communication between the oil port and the outer spacer; and
    j. wherein the outer spacer comprises at least one outer spacer oil channel therethrough, aligned with the turbocharger housing oil channel.

\* \* \* \* \*